United States Patent
Guo et al.

(10) Patent No.: US 7,941,178 B2
(45) Date of Patent: May 10, 2011

(54) SYSTEMS AND METHODS FOR SCHEDULING TRANSMISSIONS FOR COEXISTENCE OF DIFFERING WIRELESS RADIO PROTOCOLS

(75) Inventors: Xingang Guo, Portland, OR (US); Xue Yang, Portland, OR (US); Changwen Liu, Portland, OR (US); Eran Sudak, Tel Aviv (IL)

(73) Assignee: Intel Corporation, Santa Clata, CA (US)

( * ) Notice: Subject to any disclaimer, the term of this patent is extended or adjusted under 35 U.S.C. 154(b) by 1068 days.

(21) Appl. No.: 11/697,366

(22) Filed: Apr. 6, 2007

(65) Prior Publication Data

US 2008/0247367 A1  Oct. 9, 2008

(51) Int. Cl.
*H04M 1/00* (2006.01)
(52) U.S. Cl. .......... 455/552.1; 455/41.1; 455/41.2; 455/509; 455/553.1; 455/560; 370/335; 370/338
(58) Field of Classification Search .......... 370/338, 370/444, 344, 345, 350, 337; 455/41.1, 41.2, 455/552.1, 553.1, 560, 502
See application file for complete search history.

(56) References Cited

U.S. PATENT DOCUMENTS

| | | | |
|---|---|---|---|
| 6,990,082 B1 | 1/2006 | Zehavi et al. | |
| 7,046,649 B2 | 5/2006 | Awater et al. | |
| 7,142,880 B2 | 11/2006 | Schmandt et al. | |
| 2002/0075941 A1 | 6/2002 | Souissi et al. | |
| 2005/0201340 A1 | 9/2005 | Wang et al. | |
| 2006/0003802 A1* | 1/2006 | Sinai | 455/553.1 |
| 2007/0140154 A1 | 6/2007 | Chun | |
| 2007/0232358 A1* | 10/2007 | Sherman | 455/560 |
| 2007/0275746 A1* | 11/2007 | Bitran | 455/509 |
| 2008/0247445 A1 | 10/2008 | Guo et al. | |

FOREIGN PATENT DOCUMENTS

WO  WO 2008/124434  10/2008
WO  WO 2008/124445  10/2008

OTHER PUBLICATIONS

"U.S. Appl. No. 11/697,369 Non Final Office Action Mailed Nov. 10, 2009", 8 pgs.
"International Application Serial No. PCT/US2008/059153, Search Report mailed Jul. 11, 2008", 3 pgs.
"International Application Serial No. PCT/US2008/059153, Written Opinion mailed Jul. 11, 2008", 5 pgs.

(Continued)

*Primary Examiner* — Nick Corsaro
*Assistant Examiner* — Chuong A Ngo
(74) *Attorney, Agent, or Firm* — Schwegman, Lundberg & Woessner, P.A.

(57) ABSTRACT

Embodiments of systems and methods for Bluetooth and WiMAX coexistence are generally described herein. Other embodiments may be described and claimed. In some embodiments systems and methods are described to determine a temporal reference associated a frame, and then align another wireless frame with that temporal reference. Once aligned, transmissions and receptions in one wireless frame may be arranged to not temporally overlap with transmissions or reception the other wireless frame.

23 Claims, 4 Drawing Sheets

OTHER PUBLICATIONS

Acharya, A., et al., "MACA-P: a MAC for cocurrent transmissions in multi-hop wireless networks", *Proceedings of the First IEEE International Conference on Pervasive Computing and Communications*, (2003), 505-508.

Guo, X., et al., "Architecture and Methods for Coexistence of Wireless Radios Having Differing Protocols", U.S. Appl. No. 11/697,369, filed Apr. 6, 2007.

Liu, C., et al., "Minimizing Mutual Interference for Multi-Radio Co-Existence Platforms", U.S. Appl. No. 11/904,362, filed Sep. 27, 2007.

"U.S. Appl. No. 11/697,369, Final Office Action mailed May 4, 2010", 10 pgs.

"U.S. Appl. No. 11/697,369, Response filed Feb. 9, 2010 to Non Final Office Action mailed Nov. 10, 2009", 9 pgs.

"International Application Serial No. PCT/US2008/059131, Search Report and Written opinion mailed Aug. 20, 2008", 3 pgs.

"International Application Serial No. PCT/US2008/059131, Written Opinion mailed Aug. 20, 2008", 4 pgs.

\* cited by examiner

SYSTEMS AND METHODS FOR SCHEDULING TRANSMISSIONS FOR COEXISTENCE OF DIFFERING WIRELESS RADIO PROTOCOLS

TECHNICAL FIELD

The present inventive subject matter pertains to wireless communications. Some embodiments may pertain to systems that implement OFDMA and multicarrier protocols, such as WiMAX and Bluetooth®.

BACKGROUND

With the increasing availability of wireless technology and connectivity, devices carrying multiple radios will not be uncommon. For example, Bluetooth and WiMAX, may be made available on future computation and communication platforms such as laptops and handheld devices. These and other types of platforms may be equipped with multiple co-located radios. Such platforms may be referred to as a Multi-Radio Platforms (MRPs). MRPs may include the co-location of Bluetooth and WiMAX radios to accommodate various uses and conveniences. One typical usage scenario for the two radios includes the MRP relaying voice traffic between its WiMAX and Bluetooth links. A Bluetooth headset may connect to the MRP via a Bluetooth link and the MRP, at the same time, may maintain an active WiMAX VoIP session with WiMAX base station.

Bluetooth and WiMAX may operate in overlapping or adjacent frequency bands and possibly suffer from interference when they operate at substantially overlapping time instants. Interference may occur, for example, due to physical proximity and radio power leakage. The following interferences, also referred to as BT and WiMAX collisions can occur:

1. When Bluetooth transmission overlaps with WiMAX receiving in time domain at the MPR, WiMAX receiving can suffer; and 2. Similarly, WiMAX transmissions can also interfere with Bluetooth receiving operations at the MPR when they overlap in time.

Thus, there are general needs for systems and methods to allow concurrent communications between devices implementing different protocols with reduced interference.

DETAILED DESCRIPTION

The following description and the drawings sufficiently illustrate specific embodiments of the inventive subject matter to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the inventive subject matter set forth in the claims encompass all available equivalents of those claims. Embodiments of the inventive subject matter may be referred to herein, individually or collectively, by the term "invention" merely for convenience and without intending to limit the scope of this application to any single invention or inventive concept if more than one is in fact disclosed.

Although many embodiments are described with respect to the Bluetooth and WiMax protocols, the scope of the invention is not limited in this respect and may apply to any communication protocols that potentially interfere.

Figure 1:
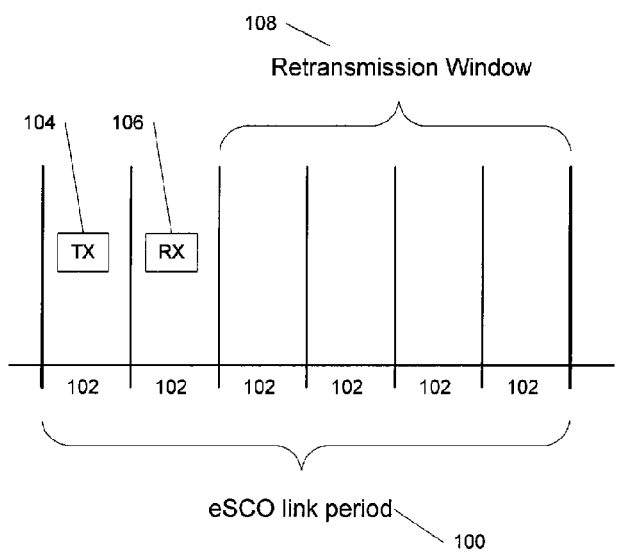
FIG. 1 illustrates a Bluetooth Extended Synchronous Connection Oriented (eSCO) link period in accordance with various embodiments.

FIG. 1 illustrates a Bluetooth Extended Synchronous Connection Oriented (eSCO) link period 100 as an example wireless frame of a wireless protocol in accordance with various embodiments. The eSCO link period 100 may make up a wireless frame which may be divided into several slots 102. Within the slots 102, master-to-slave transmissions 104 or slave-to-master receptions 106 may be scheduled on a Bluetooth Master device. Additionally, a retransmission window 108 may include a plurality of additional slots 102 for other transmissions 104 or receptions 106. On the Bluetooth Slave device paired with the Bluetooth master, the aforementioned transmission slots will correspond to reception slots, whereas reception slots on the master will correspond to transmission slots on the slave.

A Bluetooth eSCO link period 100 may include a slot 102 reserved for a master-to-slave communication, occupied by a transmission 104, and a slot 102 reserved for slave-to-master communication occupied by a reception 106. A number of additional slots 102 may exist within the retransmission window 108.

Figure 2:
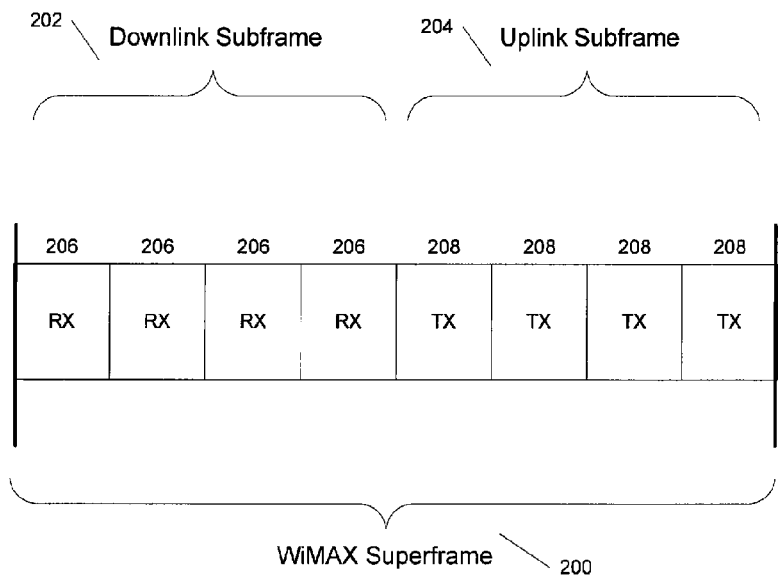
FIG. 2 illustrates a WiMAX superframe in accordance with various embodiments.

FIG. 2 illustrates a WiMAX superframe 200 as an example wireless frame of a wireless protocol in accordance with various embodiments. The WiMAX superframe 200 comprises a downlink subframe 202 including receive slots 206 and a uplink subframe 204 including transmit slots 208.

A WiMAX superframe may have a downlink-uplink ratio (DUR). The DUR is determined by the relative number of receive slots 206 used compared with the number of transmit slots 208 used. The DUR may be 1:1 if the number of receive slots 206 in the downlink subframe 202 is equal to the number of transmit slots 208 in the uplink subframe 204.

In some embodiments, the duration of the WiMAX superframe 200 may be defined by the radio transmitting or receiving the WiMAX superframe 200 in a wireless communication signal. Additionally, the duration may be determined by a standards body, and implemented by the radio. An example frame duration may be 5 ms according to various embodiments. A Bluetooth slot 102 (FIG. 1) duration may be, for example, 0.625 ms according to another embodiment. According to these example durations, a WiMAX superframe 200 may thus have a duration which is equal to 8 Bluetooth slots 102 (FIG. 1). The WiMAX superframe 200 may be broken into a number of slots based on the relative duration of a Bluetooth slot. These slots may be regarded as receive slots 206 or transmit slots 208 depending on whether the slots are present in the downlink subframe 202 or the uplink subframe 204 respectively.

Because WiMAX and Bluetooth radios may operate on the same or near frequencies, interference may occur. This interference may occur when a Bluetooth radio is transmitting at the same time that a co-located WiMAX radio is receiving, or when a Bluetooth radio is receiving at the same time the WiMAX radio is transmitting. The interference may be substantially avoided by reducing or eliminating the temporal overlap of transmission and reception between WiMAX and Bluetooth radios.

Figure 3:
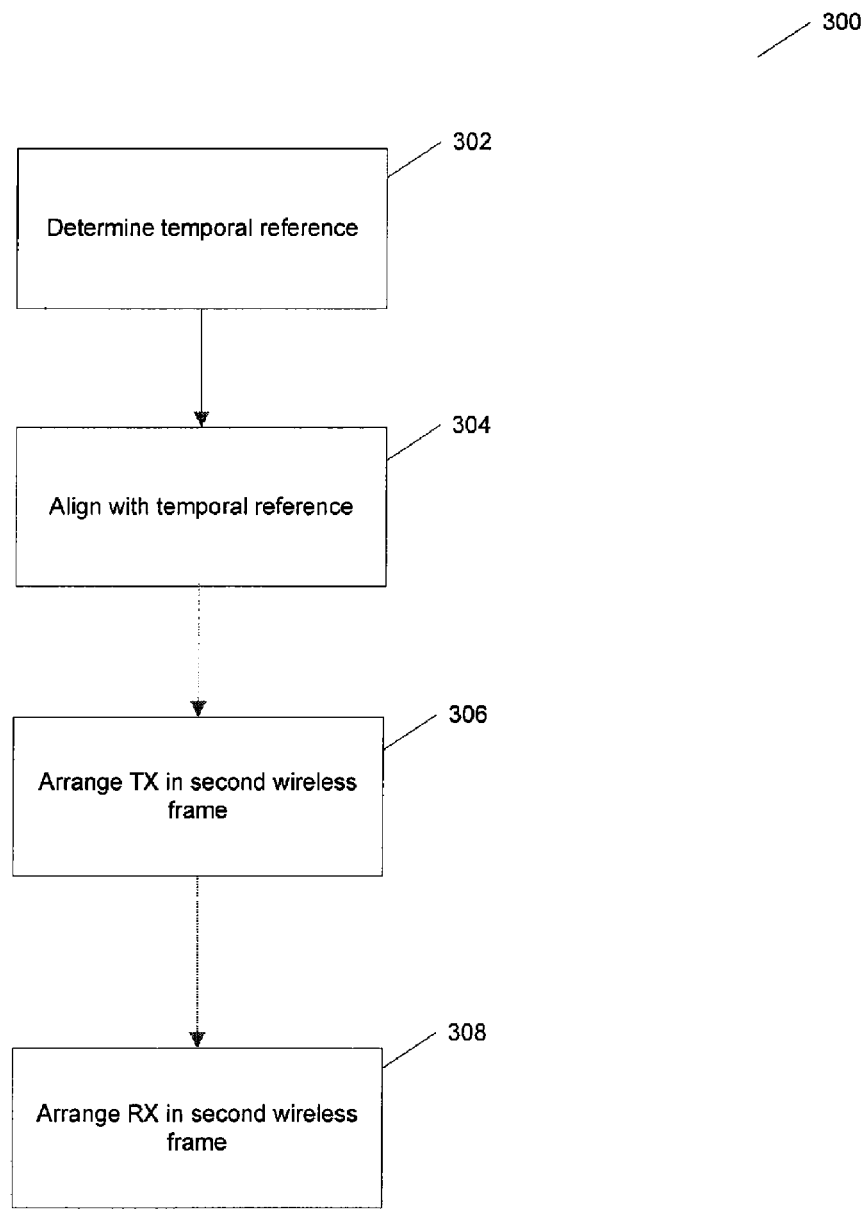
FIG. 3 is a flow diagram illustrating a method in accordance with various embodiments.

FIG. 3 is a flow diagram illustrating a method 300 in accordance with various embodiments. The method 300 begins by determining a temporal reference associated with a first wireless frame from a first wireless radio (block 302). The first wireless radio may use a first wireless protocol. The first wireless radio may be, for example, be a WiMAX radio. A second wireless radio using a second wireless protocol may align a second wireless frame with the temporal reference (block 304). The second wireless radio may, for example, be a Bluetooth radio. Aligning with the temporal reference may include an offset from a direct alignment.

Temporally overlapping wireless radio frames may cause interference in the form of collisions. Transmissions and receptions may be arranged in order to avoid collisions between transmissions and receptions in the wireless radio frames. The transmissions in the second wireless radio frame may be arranged to not occur during a reception in the first wireless radio frame (block 306). In addition, receptions in the second wireless radio frame may be arranged to not occur during a transmission in the first wireless radio frame (block 308).

According to various embodiments, the two co-located radios may be various types of radios operating using a time-division duplex (TDD) mechanism for various underlying protocols including orthogonal frequency division multiplexing (OFDM), orthogonal frequency division multiple access (OFDMA), frequency hopping spread spectrum (FHSS), other multicarrier protocols, other spread spectrum protocols and other wireless protocols. In an MRP with co-located Bluetooth and WiMAX radios, the WiMAX radio is generally part of a remote device which communicates with a base station (although other situations may exist, for example, if the WiMAX radio is operating in a mesh network). The Bluetooth radio is generally a master radio communicating with a slave device. The slave device may be a headset, earpiece, wireless speakerphone, or any number of other devices.

When dealing with the Bluetooth radio, based on the Bluetooth specification, a master can cancel a scheduled transmission at a reserved eSCO master slot, and reschedule the transmission within the retransmission window. Similarly, if a packet from the slave is not successfully received by the master, the master can POLL the slave to retransmit within the retransmission window.

Temporal overlapping of Bluetooth transmission (TX) with WiMAX receiving (RX), as well as the temporal overlapping of WiMAX TX with Bluetooth RX, may be avoided by using Bluetooth eSCO rescheduling/retransmission capabilities. More specifically, when the scheduled Bluetooth master TX overlaps with the receiving activities of co-located WiMAX radio, the master may cancel the transmission at the reserved slot and reschedule the TX to a safe-to-TX slot. On the other hand, if Bluetooth master RX is interfered by the TX of co-located WiMAX radio, the master may POLL the slave to retransmit at a safe-to-RX slot. By using various rescheduling/retransmission policies, packet loss caused by Bluetooth and WiMAX collisions at MRP may be substantially eliminated. Additionally, according to various embodiments, rescheduling/retransmission policies may be applied to the Bluetooth radio and do not require any change of transmission or reception schedule on WiMAX radio in practice.

Figure 4:
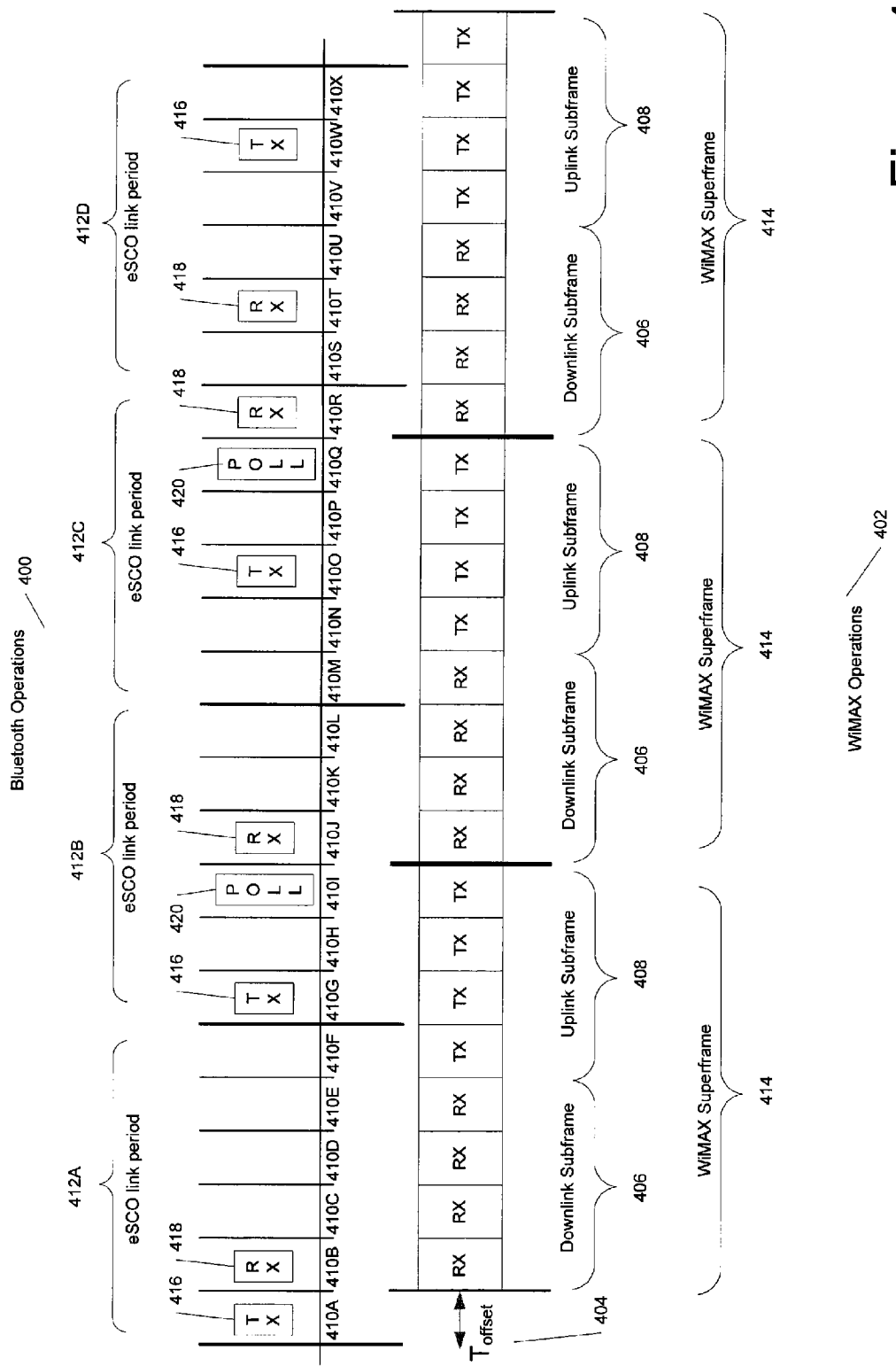
FIG. 4 illustrates an arrangement of Bluetooth operations with WiMAX operations in accordance with various embodiments.

FIG. 4 illustrates an arrangement of Bluetooth operations 400 with WiMAX operations 402 in accordance with various embodiments. The Bluetooth operations 400 include a number of Bluetooth slots 410A-X, making up several eSCO link periods 412A-D. The WiMAX operations 402 include several WiMAX superframes 414 made up of downlink (DL) subframes 406 and uplink (UL) subframes 408.

In order to consistently arrange Bluetooth transmissions and receptions an offset 404 between the beginning of the first Bluetooth slot 410A and the beginning of the nearest WiMAX superframe 414 may be determined. The offset may be determined by taking into account the various characteristics of the WiMAX superframes 414 and the Bluetooth slots 410A-X and eSCO link periods 412A-D. If $T_{offset}$ represents the offset 404 (measured in a number of Bluetooth slots 410A-X) between the first Bluetooth slot 410A start time and the first WiMAX superframe 414 start time, $T_{offset} \in [1, 5]$. Variables d and u may be used to represent the WiMAX DL subframe 406 receiving slots and the UL subframe 408 transmitting slots within each WiMAX superframe 414. Therefore, $d, u \in [1, 8]$. The period of WiMAX operations 402 (measured by the number of WiMAX superframes 414) is represented as $P_{WiMAX\_DL}$ and $P_{WiMAX\_UL}$ for DL and UL operations, respectively. With reference to a zero time reference point at the beginning of the first Bluetooth slot 410A, the following notations may be derived:

$$\text{WiMAX receiving slots}(DL): T_{offset} + d + 8P_{WiMAX\_DL}n \quad (n \geq 0, n \text{ is integer}) \quad <1>$$

$$\text{WiMAX transmitting slots}(UL): T_{offset} + u + 8P_{WiMAX\_UL}n (n \geq 0, n \text{ is integer}) \quad <2>$$

In some embodiments, each eSCO link period 412A-D lasts for 6 Bluetooth slots 410A-X according to various embodiments. The variable t may be used to represent the Bluetooth master TX slot and let t=1 correspond to the reserved master-to-slave slot. The variable r may be used to represent the Bluetooth master RX slot and r=2 corresponds to the reserved slave-to-master slot. The following notations may be derived:

$$\text{Bluetooth transmitting slots}: t + 6m (m \geq 0, m \text{ is integer}) \quad <3>$$

$$\text{Bluetooth receiving slots}: r + 6m (m \geq 0, m \text{ is integer}) \quad <4>$$

Combining <1> and <3> to determine the temporal overlap between Bluetooth TX and WiMAX RX, and <2> and <4> to determine the temporal overlap between Bluetooth RX and WiMAX TX creates the following equations respectively:

$$t + 6m = T_{offset} + d + 8P_{WiMAX\_DL}n, \text{for any } m \& n \quad <5>$$

$$r + 6m = T_{offset} + u + 8P_{WiMAX\_UL}n, \text{for any } m \& n \quad <6>$$

As each eSCO link period 412A-D lasts for 6 Bluetooth slots 410A-X and each WiMAX frame can be represented as 8 Bluetooth slots 410A-X, the least common multiple of 6 and 8 is 24. Therefore, given a choice of $T_{offset}$, the overlapping pattern repeats every 4 eSCO link periods 412A-D, for all values of $P_{WiMAX\_DL}$ and $P_{WiMAX\_UL}$. However, the overlapping pattern within 4 consecutive eSCO link periods 412A-D varies from period to period.

The solution for equations <5> and <6> is illustrated in the tables below for odd integer values of $T_{offset}$.

| WiMAX Op in (BT) slots (u or d) | M = 4 h | m = 4 h + 1 | M = 4 h + 2 | m = 4 h + 3 |
|---|---|---|---|---|
| (Possibly) Overlapped BT master slot (t or r) $T_{offset} = 1$ | | | | |
| 1 | 2 | 4 | 6 | N/A |
| 2 | 3 | 5 | N/A | 1 |
| 3 | 4 | 6 | N/A | 2 |
| 4 | 5 | N/A | 1 | 3 |
| 5 | 6 | N/A | 2 | 4 |
| 6 | N/A | 1 | 3 | 5 |
| 7 | N/A | 2 | 4 | 6 |
| 8 | 1 | 3 | 5 | N/A |
| (Possibly) Overlapped BT master slot (t or r) $T_{offset} = 3$ | | | | |
| 1 | 4 | 6 | N/A | 2 |
| 2 | 5 | N/A | 1 | 3 |
| 3 | 6 | N/A | 2 | 4 |
| 4 | N/A | 1 | 3 | 5 |
| 5 | N/A | 2 | 4 | 6 |
| 6 | 1 | 3 | 5 | N/A |
| 7 | 2 | 4 | 6 | N/A |
| 8 | 3 | 5 | N/A | 1 |
| (Possibly) Overlapped BT master slot (t or r) $T_{offset} = 5$ | | | | |
| 1 | 6 | N/A | 2 | 4 |
| 2 | N/A | 1 | 3 | 5 |
| 3 | N/A | 2 | 4 | 6 |
| 4 | 1 | 3 | 5 | N/A |
| 5 | 2 | 4 | 6 | N/A |
| 6 | 3 | 5 | N/A | 1 |
| 7 | 4 | 6 | N/A | 2 |
| 8 | 5 | N/A | 1 | 3 |

In order to eliminate the collisions between Bluetooth and WiMAX radio signals (defined as the overlapping between Bluetooth TX and WiMAX RX, as well as the overlapping between Bluetooth RX and WiMAX TX), $T_{offset}$ may be set to an odd integer value so that rescheduling/retransmission policies for Bluetooth master may be devised.

The rescheduling/retransmission policies for the Bluetooth master may include a number of possible scenarios for potential transmission and reception arrangements. The following example is one of numerous possible implementations of an embodiment of the inventive subject matter.

First, the clock on the Bluetooth radio and the WiMAX radio may be synchronized. Once synchronized, an offset 404 may be chosen. Once the value of $T_{offset}$ is chosen, it need not be changed. In FIG. 4, for example, $T_{offset}$ is 1. Next, using equations <5> and <6>, safe-to-TX and safe-to-RX slots may be determined for the Bluetooth radio. The table below illustrates an example policy:

| Bluetooth eSCO link period (m) | Possible Policy |
|---|---|
| m = 4 h | Master TX at reserved slot 1<br>Slave TX at reserved slot 2 |
| m = 4 h + 1 | Master TX at reserved slot 1<br>Slave TX at reserved slot 2<br>POLL slave to retransmit at slot 4 |
| m = 4 h + 2 | Reschedule master to TX at slot 3<br>Slave TX at reserved slot 2<br>POLL slave to retransmit at slot 6 |
| m = 4 h + 3 | Reschedule master to TX at slot 5<br>Slave TX at reserved slot 2 |

The slave TX is the equivalent of a master RX. FIG. 4 illustrates an implementation of this policy according to an embodiment of the inventive subject matter. Bluetooth master TX 416, Bluetooth master RX 418, and Bluetooth poll 420 are illustrated in their respective Bluetooth slots 410A-X according to the policy described above.

Figure 5:
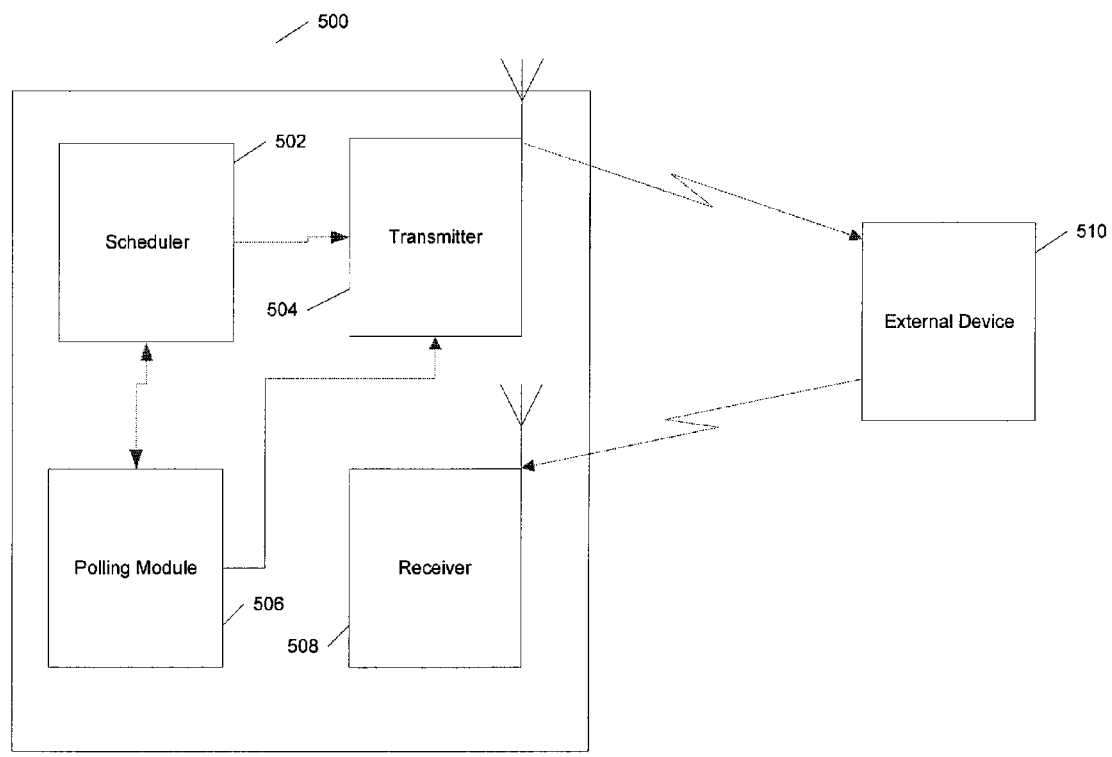
FIG. 5 is a block diagram of a radio in accordance with various embodiments.

FIG. 5 is a block diagram of a radio 500 in accordance with various embodiments. The radio 500 includes a scheduler 502, a transmitter 504, a polling module 506, and a receiver 508. FIG. 5 also includes an external device 510.

The scheduler 502 arranges the transmissions to be transmitted by the transmitter 504 to reduce or avoid interference with other nearby radios. The scheduler 502 may receive inputs or signals to allow it to determine potential arrangements for transmissions and receptions. Once an arrangement is determined, the scheduler 502 may communicate with the transmitter 504. The transmitter 504 may then transmit accordingly. Receptions may occur on a regularly scheduled basis, or may be initiated by a polling module 506. The polling module 506 may communicate with the scheduler 502 to determine the arrangement for transmissions and receptions. If a reception is to occur in a non-regular time slot, the polling module 506 may communicate with the transmitter 504 to transmit a poll requesting a reception at a non-regular time.

The transmitter 504 may be in wireless communication with an external device 510. The external device 510 may be a slave device. The external device 510 may transmit signals to the radio 500 on a regularly scheduled basis, or when it receives a poll. The receiver 508 may receive wireless communication from the external device.

The radio 500 may be a Bluetooth radio with transmissions and receptions scheduled to avoid interference with a co-located WiMAX radio. The radio 500 may implement any of the above-mentioned methods or policies (refer to FIGS. 3 and 4).

The above-mentioned systems and methods may be applied to various radio and transmission implementations in accordance with embodiments of the inventive subject matter. Various WiMAX DL to UL ratios may apply, including 1:1, 5:3, and others. Additionally, various Bluetooth protocols may be used as well, including HV3, EV3 (retransmission window of 4 slots), EV3 (retransmission window of 2 slots), and others. The results may not be the complete avoidance of interference, but the percentage of loss may decrease as compared with not implementing the disclosed methods. The same systems and methods may also be applied to address a different set of conflicting operations between WiMAX and Bluetooth. Depending on the platform design, the set of conflicting operations can be different. For example, WiMAX transmissions may interfere with Bluetooth transmissions due to power amplifier (PA) distortion. Another set of conflicting operations may include WiMAX TX interfering with both Bluetooth transmissions and receptions (where Bluetooth is the only victim).

Although the communication system is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

In some embodiments, the communication systems and methods may be implemented in accordance with specific communication standards, such as the Institute of Electrical and Electronics Engineers (IEEE) standards including the IEEE 802.16-2004 and the IEEE 802.16(e) standards for wireless metropolitan area networks (WMANs), as well as the IEEE 802.15 standards for wireless personal area networks (WPANs) including variations and evolutions thereof, although the scope of the inventive subject matter is not limited in this respect as the communication systems and methods may also be suitable for transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions. For more information with respect to the IEEE 802.15 standards, please refer to "IEEE Standard for Information technology—Telecommunications and information exchange between systems—Local and metropolitan area networks—Specific requirements. Part 15.1: Wireless Medium Access Control (MAC) and Physical Layer (PHY) Specifications for Wireless Personal Area Networks (WPANs)."

In some embodiments, devices using the radios described above may be portable wireless communication devices, such as personal digital assistants (PDAs), a laptops or portable computers with wireless communication capability, web tablets, wireless telephones, wireless headsets, pagers, instant messaging devices, digital cameras, access points, televisions, video gaming systems, medical devices (e.g., a heart rate monitor, a blood pressure monitor, etc.), or other devices that may receive and/or transmit information wirelessly. In some embodiments, a radio may operate using directional antennas, beam-forming antennas, omnidirectional antennas, multiple-input multiple-output (MIMO) antenna systems, adaptive antenna systems (AAS), diversity antennas, or other antenna configurations.

Some embodiments may be implemented in one or a combination of hardware, firmware, and software. Embodiments of the inventive subject matter may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for scheduling communications among frames of different wireless protocols comprising:
    determining at a communication device, a temporal reference corresponding to a beginning of a first wireless frame of a first wireless protocol;
    aligning a second wireless frame of a second wireless protocol with an offset from the temporal reference such that a beginning of the second wireless frame and a beginning of subsequent wireless frames of the second wireless protocol are offset from a beginning of the first wireless frame and a beginning of subsequent wireless frames of the first wireless protocol;
    arranging transmissions in accordance with the second wireless protocol within the second wireless frame to not temporally overlap with reception in accordance with the first wireless protocol in the first wireless frame;
    polling to request retransmission by an external device in accordance with the second wireless protocol, wherein the retransmission does not temporally overlap with a transmission in accordance with the first wireless protocol; and
    receiving the retransmission from the external device in accordance with the second wireless protocol.

2. The method of claim 1, further comprising arranging receptions in accordance with the second wireless protocol within the second wireless frame to not temporally overlap with transmissions in accordance with the first wireless protocol in the first wireless frame.

3. The method of claim 1, wherein the wireless protocols operate in a time-division duplex (TDD) mode.

4. The method of claim 1, wherein second wireless frame and the first wireless frame have a temporal overlap.

5. The method of claim 1, wherein the first transmission wireless frame is a WiMAX superframe.

6. The method of claim 1, wherein the second wireless frame comprises Bluetooth Extended Synchronous Connection Oriented (eSCO) link slots.

7. The method of claim 1, wherein the second wireless frame includes a plurality of slots, and wherein the offset is a multiple of a length of one of the slots.

8. The method of claim 7, wherein the multiple is set to an odd integer value.

9. The method of claim 8, wherein the first wireless frame is of a length equal to an even number of the slots.

10. A radio comprising:
    a scheduler to arrange transmissions within wireless frames in accordance with a first wireless protocol to not temporally overlap with a reception of frames in accordance with a second wireless protocol, wherein the scheduler is configured to:
        determine a temporal reference corresponding to a beginning of a second wireless frame of the second wireless protocol; and
        align a first wireless frame of the first wireless protocol with an offset from the temporal reference such that a beginning of the first wireless frame and a beginning of subsequent wireless frames of the first wireless protocol are offset from a beginning of the second wireless frame and a beginning of subsequent wireless frames of the second wireless protocol;
    a transmitter to transmit data according to the scheduler;
    a polling module in communication with the transmitter to cause the transmitter to transmit a poll for retransmission by an external device, wherein the retransmission does not temporally overlap with a transmission in accordance with the second wireless protocol; and a receiver to receive the retransmission from the external device in accordance with the first wireless protocol.

11. The radio of claim 10, wherein the second radio is a WiMAX radio.

12. The radio of claim 10, wherein the first wireless protocol corresponds to a Bluetooth Extended Synchronous Connection Oriented (eSCO) link.

13. The radio of claim 10, wherein the second wireless frame includes a plurality of slots, and wherein the offset is a multiple of a length of one of the slots.

14. The radio of claim 13, wherein the multiple is set to an odd integer value.

15. The radio of claim 14, wherein the first wireless frame is of a length equal to an even number of the slots.

16. A non-transitory computer readable medium having instructions for causing a computer to execute the method comprising:
   determining a temporal reference corresponding to a beginning of a first wireless frame of a first wireless protocol;
   aligning a second wireless frame of a second wireless protocol with an offset from the temporal reference such that a beginning of the second wireless frame and a beginning of subsequent wireless frames of the second wireless protocol are offset from a beginning of the first wireless frame and a beginning of subsequent wireless frames of the first wireless protocol;
   arranging transmissions in accordance with the second wireless protocol within the second wireless frame to not temporally overlap with reception in accordance with the first wireless protocol in the first wireless frame;
   polling to request retransmission by an external device in accordance with the second wireless protocol, wherein the retransmission does not temporally overlap with a transmission in accordance with the first wireless protocol; and
   receiving the retransmission from the external device in accordance with the second wireless protocol.

17. The non-transitory computer readable medium of claim 16, wherein the transmissions and receptions of the first wireless transmission frame and the second wireless transmission frame are arranged to substantially avoid interference.

18. The non-transitory computer readable medium of claim 16, wherein the second transmission frame includes at least one master slot, at least one slave slot and a plurality of retransmission slots.

19. The non-transitory computer readable medium of claim 18, wherein arranging transmission includes transmitting in the retransmission slots.

20. The non-transitory computer readable medium of claim 16, further comprising arranging receptions in accordance with the second wireless protocol within the second wireless frame to not temporally overlap with transmissions in accordance with the first wireless protocol in the first wireless frame.

21. The non-transitory computer readable medium of claim 16, wherein the second wireless frame includes a plurality of slots, and wherein the offset is a multiple of a length of one of the slots.

22. The non-transitory computer readable medium of claim 21, wherein the multiple is set to an odd integer value.

23. The non-transitory computer readable medium of claim 22, wherein the first wireless frame is of a length equal to an even number of the slots.

* * * * *

UNITED STATES PATENT AND TRADEMARK OFFICE
CERTIFICATE OF CORRECTION

PATENT NO.       : 7,941,178 B2                                                    Page 1 of 1
APPLICATION NO.  : 11/697366
DATED            : May 10, 2011
INVENTOR(S)      : Xingang Guo et al.

It is certified that error appears in the above-identified patent and that said Letters Patent is hereby corrected as shown below:

On the Title page, in field (75), in "Assignee", in column 1, line 1, delete "Clata," and insert -- Clara, --, therefor.

In column 8, line 37, in Claim 5, after "first" delete "transmission".

Signed and Sealed this
Twenty-first Day of June, 2011

David J. Kappos
*Director of the United States Patent and Trademark Office*